United States Patent

Cooper

Patent Number: 5,367,624
Date of Patent: Nov. 22, 1994

[54] INTERFACE FOR CONTROLLING TRANSACTIONS IN A MANUFACTURING EXECUTION SYSTEM

[75] Inventor: Dwight H. Cooper, Sunnyvale, Calif.

[73] Assignee: Consilium, Inc., Mountain View, Calif.

[21] Appl. No.: 76,465

[22] Filed: Jun. 11, 1993

[51] Int. Cl.$^5$ .................... G06F 15/00; G06F 15/40
[52] U.S. Cl. .................................. 395/157; 395/161; 395/155
[58] Field of Search ............... 395/157, 158, 155, 161, 395/154; 364/401, 402

[56] References Cited

U.S. PATENT DOCUMENTS

| | | | |
|---|---|---|---|
| 4,628,434 | 12/1986 | Tashiro et al. | 364/402 X |
| 5,111,409 | 5/1992 | Gasper et al. | 395/154 X |
| 5,140,537 | 8/1992 | Tullis | 364/401 X |
| 5,195,041 | 3/1993 | George et al. | 364/401 X |
| 5,212,635 | 5/1993 | Ferriter | 364/402 |

*Primary Examiner*—Heather R. Herndon
*Assistant Examiner*—Cliff Nguyen Vo
*Attorney, Agent, or Firm*—Blakely, Sokoloff, Taylor & Zafman

[57] ABSTRACT

Method and apparatus for an improved interface for controlling transactions in a manufacturing execution system. A common display interface is displayed on a computer system display which represents a series of transactions for a single manufacturing process, The common display interface includes a plurality of subdisplays each separately accessible through the common display interface. Each of the plurality of subdisplays includes various information related to the step in the manufacturing process represented by the subdisplay, The common display also can access a first group of the plurality of subdisplays in a sequential order and perform transactions related to the subdisplays in a sequential order. The common display also can access a second group of the plurality of subdisplays at arbitrary time intervals, and performing transactions associated with the second group of the plurality of subdisplays at the arbitrary time intervals.

43 Claims, 9 Drawing Sheets

600

600

600

600

INTERFACE FOR CONTROLLING TRANSACTIONS IN A MANUFACTURING EXECUTION SYSTEM

BACKGROUND OF THE INVENTION

1. Field of the Invention

The present invention relates to transactional databases. Specifically, the present invention relates to an improved interface for controlling transactions in a transactional database which models manufacturing.

2. Background Information

Transactional database systems are well-known to those skilled in the database management art. Some transactional databases are widely distributed systems wherein data for the database is maintained in a central location, and users may update that information by executing "transactions" in the system which are discrete series of operations performed on data in the database. Transactional databases are used for modeling a number of things, including, but not limited to, objects on a factory floor. A transactional database used for modeling objects on a factory floor is known as a manufacturing execution system and allows managers in a factory to allocate resources, generate work orders, generate bills of material, and other items in a system to adequately manage the manufacturing process. Thus, managers may model such items as plants, specific areas within plants, labor resources, equipment resources, activities, materials, and other objects typically used within the manufacturing environment for scheduling, production, and other management functions. Such databases also provide the capability to monitor activities within the factory and determine whether resources are being appropriately allocated.

Typically, such transactional databases provide means for operators at given workstations within the manufacturing environment to update the database as material is manufactured or the status of resources in the factory is changed. For instance, specific machinery may be brought down for repair or placed into different operating modes, or particular items may be manufactured in the factory. The database must be updated to reflect these changes. For example, objects or records representing raw materials may be input to a process which generates additional records representing intermediate or complete products. The records or objects representing the raw materials are then either deleted or adjusted in quantity to reflect the consumption of the materials in the factory. Other transactions specifically related to activities in the factory are performed in manufacturing execution systems and are typically performed under control of operators of workstations in the factory.

Various products have been known in the prior art to model manufacturing execution using such a transactional database. Two products include the WorkStream and FlowStream products available from Consilium, Inc. of Mountain View, Calif. Although these products provide a wide variety of transactions and other activities which may be performed within the transactional database for monitoring manufacturing activities, they have also suffered from several deficiencies of user interaction and control of transactions. For example, The WorkStream product allowed operators at workstations in the factory to perform a variety of transactions. Unfortunately, these transactions were under control of a command line interface and required that the operator input a response, typically one of an options list of transactions to be performed. Also, during the execution of transactions for the operation, no feedback information was provided to the operator indicating that the transaction was being performed. This user interface also suffered for the defect that it did not provide sufficient information to the user to indicate the time and date that the transaction was being performed, and whether the transaction was in fact capable of being performed at that stage in the manufacturing process. Another deficiency of prior art manufacturing execution systems is that if conditions varied from nominal operating parameters the operator could not indicate this information in any way in the traditional transactional database. Lastly, these prior art systems also provide no analog to prior manual methods of tracking manufacturing, such as maintaining a log or notebook of activities on the factory floor. This defect of the prior art will be discussed in more detail below.

Due to regulatory requirements, in order to obtain and maintain Food and Drug Administration approval, for example, prior art monitoring of the manufacturing of pharmaceuticals requires specific detailed journal entries at each step of the manufacturing process in a "notebook" which is hand-carried workstation to workstation in a factory. Some steps in the manufacturing process are also required to be monitored by a supervisor or other personnel. Operator and/or process supervisor approval (in the form of signatures or "signing off") is sometimes required to validate each manufacturing step. Operator personnel are often required to record information in the notebook such as amount of raw material consumed, amount of final product generated. Also, some manufacturing operations may require that time, or temperature, and speed of manufacturing equipment (for example) be recorded. Some operations also require that deviations from nominal operating conditions be monitored and recorded in the notebook. The manual notebook entry methods used in the prior art suffer primarily from the shortcoming that the notebook must be hand-carried from workstation to workstation in the factory for each step of a process for a particular manufacturing batch. This approach is also subject to problems typically associated with the entry of data on paper, such as the modification of data, wear and tear and/or destruction of the notebook, and the fraudulent entry of data. The secure storage of the notebook also poses a problem. Finally, steps which need to be performed in a particular sequence may be performed out of order using this prior art method. In summary, the prior art manual notebook suffers from many shortcomings.

It is apparent that there is a dichotomy between the automated transactional database used for manufacturing execution systems, and the regulatory requirements for auditing the manufacture of certain items. Thus, a need has arisen for improved user interaction and a user interface for such transactional databases, to automate entry of information in a manufacturing execution system, maintain rigid control of transactions in a defined sequence, and secure maintenance of information related to transactions. A need has thus arisen for a richer set of functions than is currently provided by either prior art manufacturing execution systems and/or manual recordation of certain information, especially those required for regulatory purposes.

SUMMARY AND OBJECTS OF THE INVENTION

One of the objects of the present invention is to provide an improved interface for interacting with a transactional database for a manufacturing execution system.

Another of the objects of the present invention is to provide an improved interface which eliminates the need for manual recordation of information and control of the performance of steps in a transactional database for a manufacturing execution system.

Another of the objects of the present invention is to provide a means for executing steps in a transactional database in a specific sequence and further for performing other steps out of sequence.

Another of the objects of the present invention is to provide an improved interface which requires stringent control such as operator and/or supervisor approval of transactions in a manufacturing execution system.

These and other objects are provided by a method and apparatus for an improved interface for controlling transactions in a manufacturing execution system comprising a common display interface displayed on the computer system display. The common display interface represents a series of transactions for a single manufacturing process (in one embodiment those performed at a single workstation, known as a chapter), wherein the common display interface includes a plurality of subdisplays (in one embodiment referred to as "pages") each separately accessible through the common display interface. Each of the plurality of subdisplays is related to subprocesses within the single manufacturing process and references discrete sets of transactions within the transactional database (e.g. for the workstation). Each of the plurality of subdisplays includes: work instructions for instructing operator actions related to the subprocess associated with the subdisplay; a field comprising a plurality of factory objects for performing the transactions related to the subdisplay; a label identifying the subprocess associated with the subdisplay; and time value fields indicating when the transactions associated with the subdisplay commenced and terminated. The common display also includes a means for accessing a first group of the plurality of subdisplays in a sequential order (e.g. fixed pages), wherein a first subdisplay in each of the first group is displayed first, and the transactions associated with the first subdisplay being performed prior to the display of subsequent subdisplays, and performance of transactions for the subsequent subdisplays. The common display also includes a means for accessing a second group of the plurality of subdisplays at arbitrary time intervals (e.g. floating pages), and the performance of transactions associated with the second group of the plurality of subdisplays at the arbitrary time intervals. In various embodiments, execution of transactions for each of the subdisplays may only be performed upon operator, supervisor or verifier approval using a security apparatus (e.g. password protection).

Other objects, features, and advantages of the present invention will become apparent from viewing the accompanying figures and from the detailed description that follows below.

BRIEF DESCRIPTION OF THE DRAWINGS

The present invention is illustrated by way of example and not limitation in the figures of the accompanying in which like references indicate like elements and in which.

DETAILED DESCRIPTION

The present invention is an improved interface for use in a manufacturing execution system which employs a graphical user interface (GUI). A manufacturing execution system, as will be discussed here, is a transactional database management system which models items on the factory floor as objects within a database. For example, in a factory, such objects are generally broken into two categories: facilities and resources. Facilities comprise such items as plants, work centers, work areas, and stations, wherein each is related to the other in a hierarchical fashion. In other words, plants are broken down into work centers, work centers are broken into work areas, and work areas are broken into individual stations. In addition, facilities also comprise storage areas wherein raw materials and other intermediate items may be stored temporarily either between production runs or from one area in the hectory to another. Resources comprise items such as labor, equipment, material, and processes. Using defined resources and facilities, the manufacture of items from raw materials to complete products may be modeled using transactions in the database. In this manner, appropriate amounts of resources such as labor, equipment, and material may be allocated at appropriate times in order to ensure that adequate resources and facilities are available at the time when a production run is commenced in a factory. Scheduling and monitoring of activities on the factory floor is thus enabled.

The preferred embodiment of the present invention uses an object-oriented approach to modeling the factory floor in a transactional database management system, wherein each of the facilities and resources are treated as discrete objects to be transformed within the database. Although the specifics of the database are not critical for understanding the present invention, the present invention uses a distributed architecture for maintaining the database so that a central server containing the database need not be burdened with the task such as displaying information to users, providing user feedback, and other basic tasks. Although the specific implementation for the manufacturing execution system is not critical for an understanding of the present invention, such a distributed architecture allocates computing power efficiently. One example of such a system includes the FlowStream system available from Consilium, Inc. of Mountain View, Calif. A general block diagram of a system upon which the present invention may be implemented is illustrated in FIG. 1.

Figure 1:
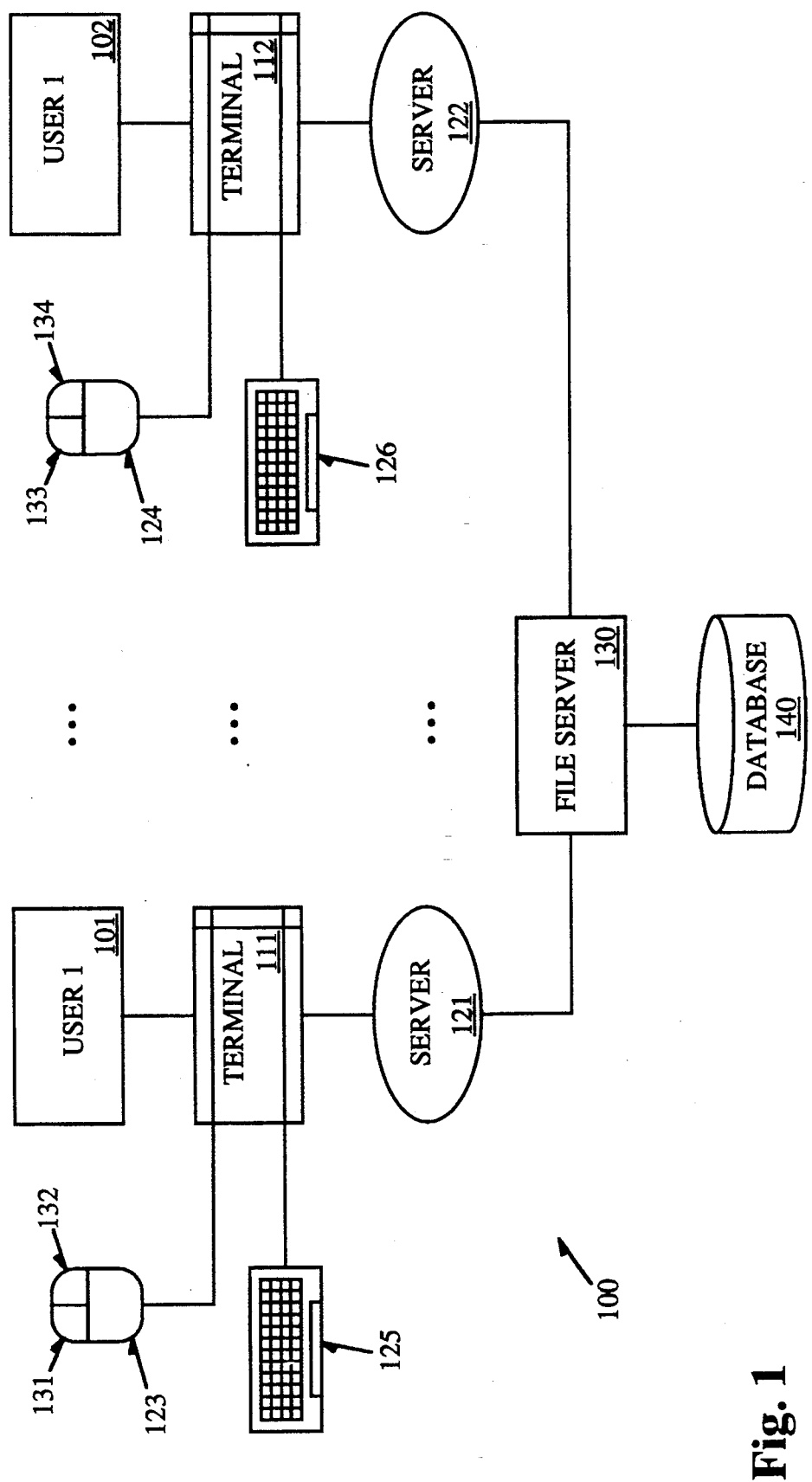
FIG. 1 shows a block diagram of a system upon which various embodiments of the present invention may be implemented.

As illustrated in FIG. 1, a system such as 100 may comprise a central database 140 which is under control of a file server 130. Thus, all transactions to and from the database may be performed at a central location (e.g., 130) so that database integrity may be maintained. However, in order to provide prompt user feedback and reduce the computational overhead on central file server 130. a plurality of application servers such as 121 and 122 may be coupled to the file server in the system in order to provide user interface, input/output functions and also communicate with file server 130 for performing transactions. Thus, although user actions and other display of information on terminals such as 111 and 112 may appear to the user to occur in real-time, transactions actually may take a specific amount of real-time to be validated prior to actual performance of the transactions in database 140. Coupled to each terminal such as 111 or 112 may be a variety of user input devices such as a mouse 123 or 124 and associated selection buttons 131. 132, 133, or 134, respectively, for performing various actions on the user interface displayed on terminals 111 and 112. Moreover, a keyboard or other alphanumeric input device such as 125 or 126 may be coupled to terminals 111 and 112 for the entry of alphanumeric data. In addition, other devices such as bar code readers, magnetic strip readers, or other input/output devices may be coupled to the terminals for user interaction. In addition, although not shown, file server 130 may be coupled to an application server and automated manufacturing equipment for the downloading of automated commands to the equipment during certain intervals to perform specific manufacturing operations. Sampling of various types of data may also be performed using sensors and other automated input/output devices in such an automated environment. Because the present invention is directed primarily towards an improved user interface for the control of transactions within file server 130 and the associated presentation to the user on terminals such as 111 and 112, the specific configuration of such a manufacturing execution system such as 100 is not necessary to understand the present invention.

One embodiment of the present invention may be implemented using the OSF/MOTIF graphical user interface (GUI), and application or interface servers such as 121 and 122 may be one of any number of workstations commercially available, such as the SPARCstation available from Sun Microsystems of Mountain View, Calif., or the DECstation or VAXstation available from Digital Equipment Corporation of Maynard, Mass. A file server such as 130 which communicates with each workstation comprises one of the super-mini class of computer systems such s the VAX series of computers available from Digital Equipment Corporation of Maynard, Mass., or any other suitable computer which is generally commercially available, for providing database transactions and maintaining a very large database for a large number of users.

Note that the following discussion of the methods and apparatus of various embodiments discussed herein will refer specifically to a series of routines which are compiled, linked, and then run as object code in computer system 100 during runtime. It can be appreciated by one skilled in the art, however, that the fore, going methods and apparatus may be implemented in special purpose hardware devices, such as discrete logic devices, large scale integrated circuits (LSI's), application-specific integrated circuits (ASIC's), or other specialized hardware. The description here has equal application to other apparatus having similar function.

Database 140 is generally configured at system design time, wherein various objects in the factory floor are modeled as "objects," as previously discussed. Although the specific design of any database is not relevant for a discussion of the present invention, it is necessary that a system administrator or other system designer configure the system for appropriate facilities and resources for a factory in order to use the graphical user interface of the present invention. This is done by defining facilities and resources which are used at each stage of the manufacturing process (e.g., for resources-from raw materials to complete products).

User Interface of One Embodiment

Before discussing the preferred embodiment in detail, a brief overview of the user interface used in this system is required. A "windowing" or graphical user interface (GUI) operating environment is used wherein selections are performed using a cursor control device such as 123 shown in FIG. 1. Typically, an item is "selected" on a computer system display such as 111 using cursor control device 123 by positioning a cursor, or other indicator, on the screen over (or in proximity to) an object on the screen and by depressing a "selection" button (e.g., 131 or 132) which is typically mounted on or near the cursor control device. The object on the screen is often an icon which has an associated file or operation which the user desire s to use in some manner. In order to launch a user application program, in some circumstances, the user merely selects an area on a computer display represented as an icon by "double clicking" the area on the screen. A "double click" selection is an operation comprising two rapid activations of the selection device by the user, while positioning the cursor over a desired area on the display (e.g., an icon).

"Pull-down" or "pop-up" menus are also used in this embodiment. A pull-down or pop-up menu is a selection which is accessible by depressing the selection button when the cursor is pointing at a location on the display such as a menu bar (typically at the top of the display screen), and "dragging" (moving cursor control device 123 while the selection button is depressed) until the selection the user wishes to access is reached on the pull-down menu. An item is indicated is being "selected" on a pull-down menu when the item is highlighted or displayed in "reverse video" (white text on a black background). The selection is performed by the user releasing the selection device when the selection he wishes to make is highlighted.

Note also that GUI's may incorporate other selection devices, such as a stylus or "pen" which may be interactive with a display. Thus, a user may "select" regions (e.g., an icon) of the GUI on the display by touching the stylus against the display. In this instance, such displays may be touch or light-sensitive to detect where and when the selection occurs. Such devices may thus detect screen position and the selection as a single operation instead of the "point (i.e., position) and a click" {e.g., depress button), as in a system incorporating a mouse or trackball. Such a system may also lack a keyboard such as 122 wherein the input of text is provided via the stylus as a writing instrument (analogous to a pen) and the user handwritten text is interpreted using handwriting recognition techniques. These types of systems may also benefit from the improved manipulation and user feedback described herein.

Notebooks and Logbooks

The present invention is a user interface which uses a "notebook" metaphor for modeling various activities in a factory. As was common in prior art manufacturing of certain items such as pharmaceuticals, typically a handwritten or manual "notebook" was associated with a particular production run or batch of a specific product. This notebook was later used to validate the manufacturing process and validate batches, especially for regulatory purposes. The notebook provided a means for logging and verifying that certain operations within the production process took place. This notebook was typically transported from workstation to workstation in a prior art manufacturing environment wherein, as each step in the process was completed at different workstations in the factory, supervisors or operator personnel would "sign off" particular sections in the notebook and such personnel could add notations about the particular batch being manufactured. Upon completion of a particular production run of a product, the notebook would later be available for audits by regulatory agencies. Such a batch history was necessary in the prior art in order to provide sufficient information to validate the manufacturing process. In the event of a question of integrity of a particular batch, this information would be reviewed by regulatory personnel to determine whether a recall was necessary.

In the embodiments of the present invention, the manual notebook metaphor has been extended to an automated transactional database in order to provide an audit trail of transactions and also provide specific information about the batch or process as it proceeds. For the remainder of the application, the "notebook" will refer to the user interface and associated stored data (such as information entered in the user interface and the audit trail of transactions) which is used for either a process or a production run to manufacture a product. A "log book" is similar to a notebook but stores information which is used for station or equipment-specific activities such as maintenance or calibration. In general, a notebook is associated with and is used for keeping track of a process for producing a product and the log book is associated with activities specific to a station, storage, labor, or equipment. "Execution" of a notebook will refer to the completion of the user interface displayed on operator consoles and the performance of transactions in the database associated with the notebook. Executing a log book does not result in the production of one or more products whereas the execution of a notebook does.

There are two types of notebooks: master notebooks; and working notebooks. Master notebooks are notebooks created by a process engineer for defining a particular process and are copied for use as working notebooks. Working notebooks are those used for particular productions runs of a material and may be saved for later review during audits or regulatory review. A working notebook therefore maintains specific information about a specific manufacturing production run such as times and dates of completion of each step in the process, the number of items manufactured, information about equipment used during manufacturing, operator notes, etc. A notebook can be accessed at four distinct intervals: during creation of a master notebook; during "execution" of a working notebook for a batch (for the control of transactions during manufacturing); after execution to update information in the notebook (typically performed by a supervisor); and after completion of a notebook for review of a production run.

The Creation of a Master Notebook

Figure 2:
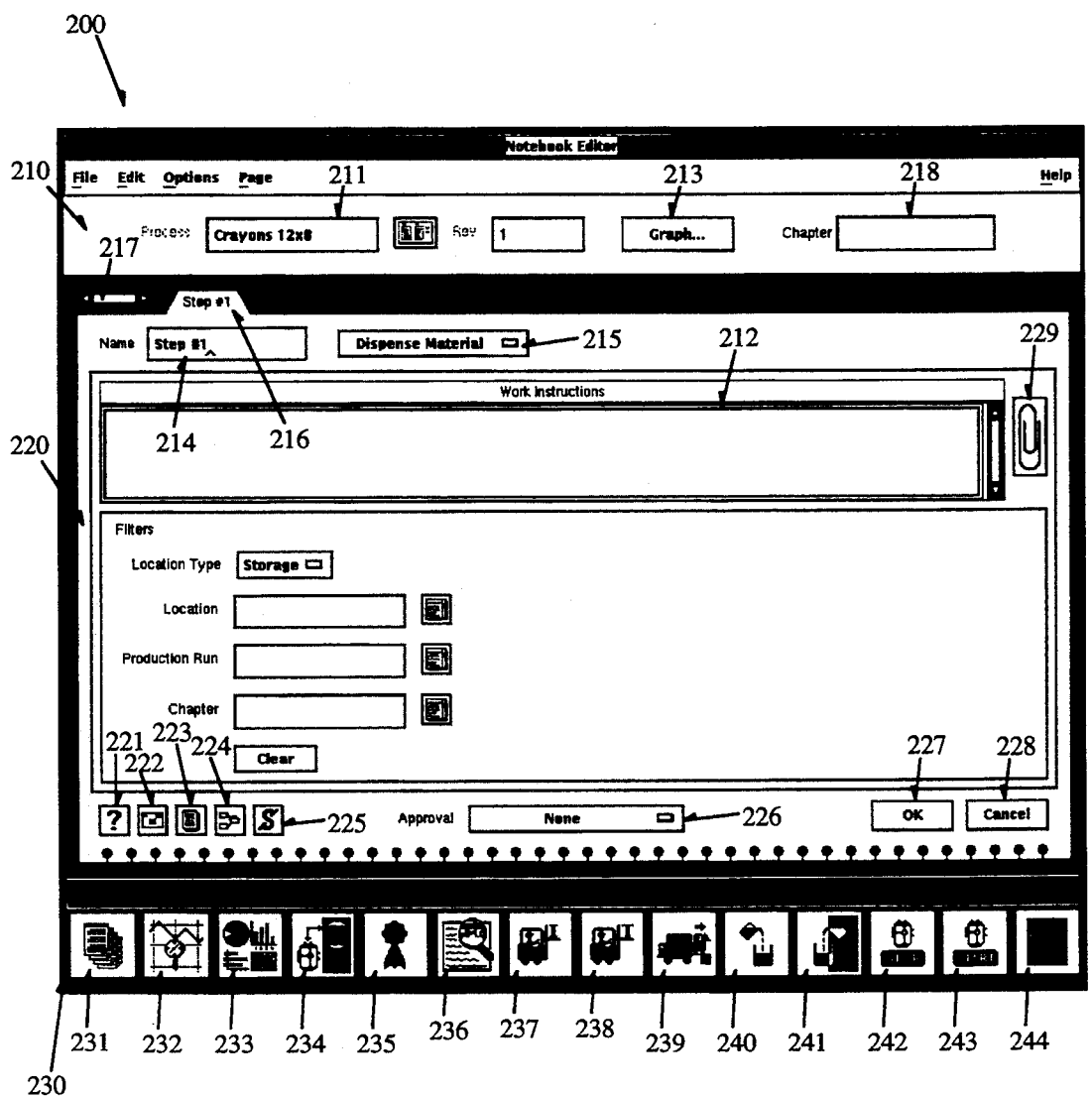
FIG. 2 shows a setup display for the improved interface of various embodiments of the present invention.

An example of a "master" notebook is illustrated in FIG. 2. 200 of FIG. 2 illustrates a single notebook page which is being currently viewed at the "setup" or notebook editor stage of the system. This allows a process engineer to define a master notebook and associate it with a particular process in the system. The master notebook is later used as the basis for a "batch" notebook which is associated with a production run to make a particular product. Each notebook and the displayed notebook page has three primary areas: process association area 210; page description area 220; and floating page icon bar 230. Process association area 210 allows the process engineer to associate the notebook being created with a process which has already been defined. For example, the process may be sets of transactions performed at each workstation on the factory floor. The process proceeds from a first workstation to a second once the transactions for the first workstation are complete. A process is associated with the master notebook when the process engineer selects in region 211 (a pop-up menu) a process from a list of all the processes for the facility currently designed. Page description area 220 contains all the relevant information for the particular notebook page being created. This will be discussed in more detail below, however, page description area 220 will typically consist of information regarding a specific step at a particular station in the manufacturing process, such as items being manufactured, raw materials being consumed, facilities being used, etc. This information is reflected in the database by modifying records via transactions. Floating page icon bar 230 is used for displaying and inserting pages into the notebook which do not need to be executed in a defined sequence (these pages are optional—do not need to be executed at all by the operator during notebook execution). Other pages which are inserted and shown in a region 220 are typically "sequential" or "fixed" pages which must be executed in a defined sequence. This is discussed below.

Figure 3:
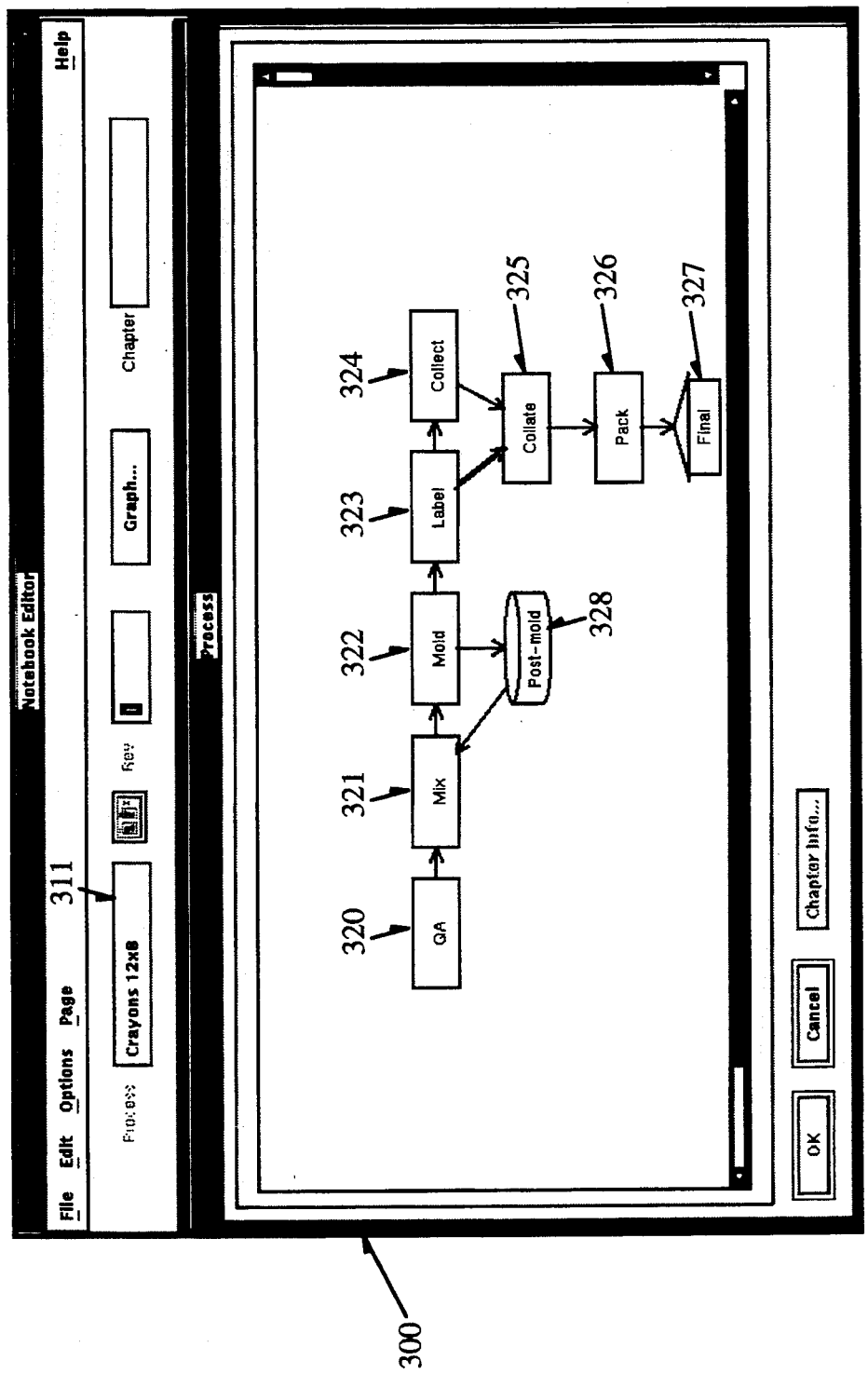
FIG. 3 shows a process graph which may be used for editing and displaying process steps within various embodiments of the improved interface of the present invention.

As is illustrated in 300 of FIG. 3, a process graph may be displayed which illustrates each of the steps which are taken at each workstation in a factory to manufacture a particular item. When a notebook is created, it is associated with a process name, which was illustrated, for example, in field 211 of FIG. 2. This process name "Crayons 12×8" appears in field 311 of FIG. 3. The process graph comprises a series of icons 320-328 which each illustrates steps to be taken at particular workstations or areas of the factory during the production process. Icons 320-326 each represent sets of operations which are performed at different workstations during the manufacturing process, and icon 328 represents a storage or a rework path. This path may be taken during production if material is passed to the "molding" step illustrated by icon 322 back to the "Mix" step illustrated by icon 321. A storage area is also a typical end point for any process, and this is illustrated on the process graph by icon 327. An entire "notebook" is associated with a single manufacturing process such as 300 in FIG. 3.

For each operation in the manufacturing process such as those illustrated by icons 320-326, sets of notebook pages are associated with the operation. Each of these sets of pages is known as a "chapter." When a production run is started, the "chapter" for the notebook is dispatched to the workstation to which it pertains as soon as the previous workstation chapter is complete, as represented on the process graph 300. Thus, each workstation has a common display interface for the notebook which is associated with the workstation and allows the access and manipulating of subdisplays or specified pages in the notebook chapter for specific manufacturing steps at the workstations (each of which are modeled by transactions in the database). These subdisplays or "pages" cause area 220 of FIG. 2 to be updated as each of the subdisplays is accessed from the main notebook interface display during setup or run-time. The only icons in the manufacturing process which do not have chapters associated with them are storages such as 327, since no manufacturing operations are performed on a product while it is in storage and therefore no data needs to be updated in the database. A process engineer may cream and access chapters in the notebook by selecting one of icons 320–326 on process graph 300.

Figure 4:
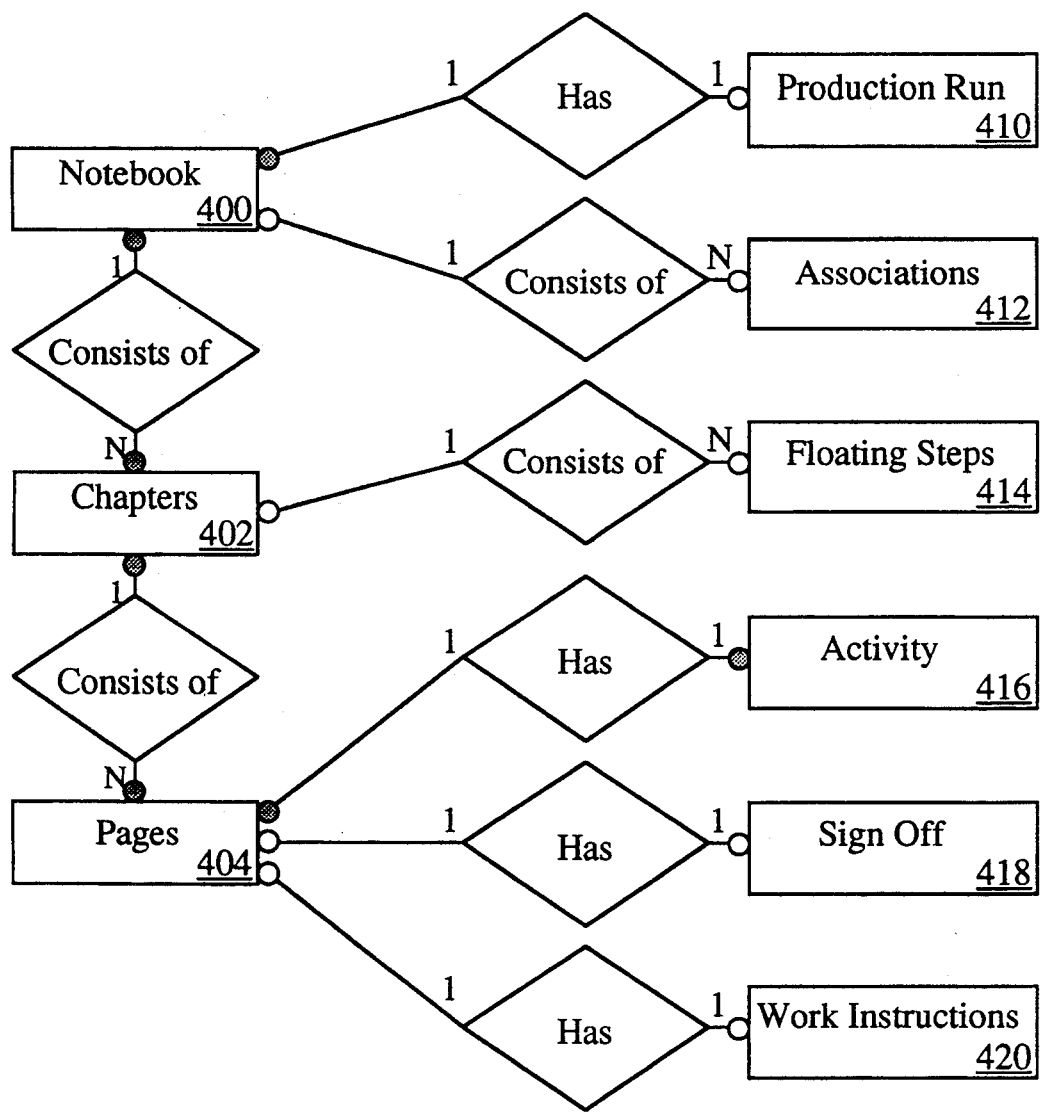
FIG. 4 is a diagrammatic view of the structure of the improved interface of one embodiment of the present invention.

A brief summary of the remaining terminology discussed with regard to the notebook will now be illustrated briefly with reference to the entity relationship diagram of FIG. 4. In the entity relationship diagram of FIG. 4, filled circles represent mandatory relationships, and open circles indicate optional relationships. As is clearly illustrated, a notebook 400 consists of chapters 402 which each consists of notebook pages 404. A production run 410 must be associated with a notebook in the transactional database. A series of transactions for a production run must have a notebook associated with it in this embodiment. A notebook 400 may further consist of associations 412 between other notebooks. This may be used for related notebooks for related production runs. Chapters 402 may consist of floating steps 414 (steps not required to be executed in a particular sequence), however, :hey must consist of pages 404. Pages 404 further must consist of activities 416 but may consist of sign offs 418 for supervisors, operators, or verifiers. Pages 404 may also consist of work instructions 420, if desired by the process engineer.

Returning to FIG. 2 for a moment, a variety of icons are present on a notebook page such as 200 to perform certain functions while a process engineer is defining the notebook. Any or all of these icons may also be available during notebook run-time for use and execution by the operator. For example, during setup, if the process engineer selects one of the subprocess icons 320–326. as is illustrated in FIG. 3, then he may proceed to create or modify a chapter in the notebook which represents a sequence of process steps (represented by transactions in the database) performed at a particular workstation. The chapter or subprocess executed at the workstation is represented by the selected icon on the process graph. Pages are executed by the operator in a defined sequential order for a chapter, except for a floating steps which may be executed at arbitrary times. Any of the following pages in a notebook may be defined:

Assemble bill of material;
Change equipment status;
Change material quality;
Collect data;
Collect user-defined attributes (UDA's);
Consume formula;
Credit work;
Dispense material;
Display plant monitor;
Display SQC (Statistical Quality Control) chart;
Display process instructions;
Issue material;
Move material;
Receive material;
Start resources;
Stop resources;
Unreserve material.

Each of these operations causes the performance of transactions in the database such as the creation, modification or deletion of records depending on whether material is consumed, equipment is started, etc. As will be discussed below, each of the pages in the notebook receives a tab icon (e.g., 216) which allows the user to select a page or access a subdisplay for steps within the subprocess (the notebook chapter). These notebook pages may only be executed in sequential order as defined by the process engineer, and the associated transactions in the database are only performed upon the completion of a previous page. However, these pages may be viewed without executing the associated transactions by selecting the tab icon associated with the page (e.g., 216) during run-time. These sequential or "fixed" pages are represented by a solid outline around the tab.

In contrast to fixed pages which must be executed in order, "floating" pages are represented during run-time by the presence of their associated icons on floating page icon bar 230 (see also, 528 of FIG. 5 below). Floating pages may be accessed and executed at any time during chapter execution. The page may be added to the chapter during setup, if desired by the process engineer, by the selection of the appropriate icon on icon bar 230. These pages are also represented by a dotted tab outline during run-time, (see icon 526 of FIG. 5 discussed below) when the floating page has been executed. All permissible floating pages are available to the process engineer during setup, so they are currently displayed on icon bar 230 in FIG. 2, however, only those set up by the process engineer are available during run-time. These icons represent the following activities which can be used as floating steps for transactions within the system:

Display process instructions (icon 231);
Collect data (icon 232);
Display plant monitor (icon 233);
Change equipment status (icon 234);
Change material quality (icon 235);
Display SQC (Statistical Quality Control) chart (icon 236);
Issue material (icon 237);
Move material (icon 238);
Receive material (icon 239);
Dispense material (icon 240);
Unreserve material (icon 241 );
Stop resources (icon 242);
Start resources (icon 243); and
Credit work (icon 244).

These icons may each be selected to allow execution of any of these transactions at any time during notebook execution. Any or all of these icons may be displayed during an operator session within a chapter if the process engineer has indicated that that floating page is part of the chapter. If not, then the icon is not displayed during run-time.

In addition to fixed pages and floating pages, 200 provides a variety of other activities which may be setup by the process engineer and used by the operator during execution of a notebook. For example, icon 221 may be selected by the user for providing system help information to the operator during execution or process engineer during setup of the notebook. Mail icon 222 may be selected for sending mail to and from other users, and icon 223 may be selected during run-time to allow an operator to associate notes with the notebook page, such as comments about the current page (e.g., deviations from nominal operating parameters). These notes may also be accessed during review of the notebook after a production run. The process graph (e.g., 300 in FIG. 3) may be displayed by selecting icon 224. When a particular notebook chapter is being executed by an operator or being setup by the process engineer, the current chapter will be reflected on the process graph as a darkened or highlighted icon.

In addition to the previous functions, "scripts" may be associated with each page in the notebook during setup by the process engineer by selecting icon 225. Scripts are written in an interpretive command language which is executed at runtime. Scripts may be used to perform operations such as check conditional operators (e.g., error or result conditions), perform calculations, or branch to other pages in the notebook. The sequence of execution of fixed notebook pages may thus be altered by executing a script associated with the notebook page. Scripts may be executed before and/or after execution of transactions associated with the notebook page. These are known as pre-scripts and post-scripts. Scripting languages are wellknown in the prior art, however, one scripting language which has been used in prior art manufacturing execution systems and may be used in this system is that which has been available in the FlowStream system available from Consilium, Inc. of Mountain View, Calif. Depending on operating conditions detected during run-time (e.g., whether particular transactions associated with a notebook page have successfully completed, the presence of certain conditions, etc.), the execution sequence of notebook pages may be altered, and other pages in the chapter may be branched to other than the next sequential page as defined by the process engineer. This allows for any reworking paths or other types of conditions which may be detected during chapter execution at a workstation in the factory. As will be discussed below, icon 225 is replaced by a suspend icon during notebook run-time, (see, icon 544 of FIG. 5) to allow the operator to halt notebook execution. Using the suspend icon, the state of the notebook may be stored, and execution resumed at the place where it was halted a later time.

The notebook page also comprises an approval field 226, shown as a pop-up menu on the setup display. This allows the process engineer to define whether the page must be approved prior to execution of the transactions associated with the current page and allow the operator to proceed to execute the next page in the notebook. As is illustrated in field 226, the current notebook page has no approvals required, however, approval may be performed by an operator, a supervisor, a verifier, or any combination thereof, as specified by the process engineer via pop-up menu 226. Approval for execution of the page is made in one embodiment of the present invention when the operator, verifier, or supervisor enters his name and his associated password using well-known prior art security techniques. It is anticipated that, in other embodiments, approval may be provided for by reading a magnetic strip on an identification badge, for example, using a magnetic strip reader or other verification technique. This verification information is recorded in the batch record for the notebook during run-time so that a history of a particular individual's approval for execution of the notebook and the associated transaction(s) may be later reviewed. The approval is therefore recorded to provide a history of the batch run when material is manufactured.

As is typical in some prior art user interfaces, icons 227 and 228 are provided to either allow execution of the notebook page (or the creation of the page during setup) when icon 227 is selected or abort execution (or creation of the page during setup) by selecting icon 228. In addition, interface 200 of FIG. 2 provides an icon 229 which may be selected by the process engineer during setup time or by the operator during run-time to access additional work instructions not currently displayed in field 212.

A Run-Time Notebook

Once a production run has been dispatched from a central location such as a supervisor or administrative terminal in the system, chapters for the notebook are issued to individual workstations in the factory as the production run proceeds through the factory (e.g., the previous chapter for the notebook has been completed at a previous workstation). This is done by issuing portions of the notebook which contain the relevant chapter for the workstations using techniques well-known to those skilled in the distributed database arts. As chapters for production runs become available at a workstation, the operator of the workstation can select a current job which he desires to work on. Then, the chapter in the notebook which pertains to that workstation is dispatched to the workstation and displayed on the operator's console. One example of such a notebook chapter displayed during run-time at an operator console is illustrated in FIG. 5.

Figure 5:
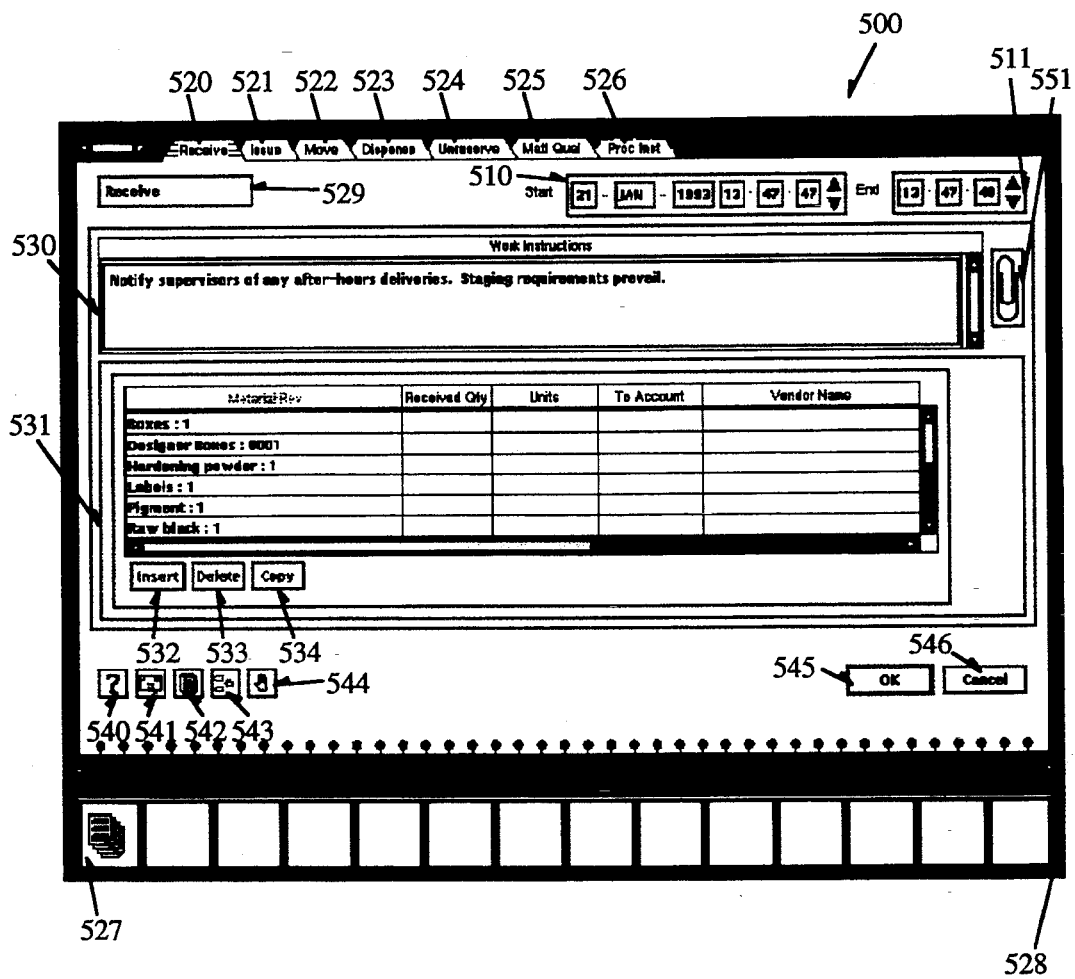
FIG. 5 shows a user interface display which is displayed during run-time in various embodiments of the present invention.

Screen display 500 of FIG. 5 shows a chapter in a notebook (e.g., common display), associated with a particular workstation, along with a page of the chapter (subdisplay) currently displayed on the operator's workstation. As can be seen, the chapter in the notebook contains several pages (subdisplays), each accessible and represented by tab icons 520–526. The display is similar to that shown in FIG. 2, however, other fields are displayed such as start time field 510 and end time field 511 which illustrate the start and end times of execution of this page in the notebook chapter by sampling a master system clock. The start time displays the time at which the notebook page was displayed, and the end time displays the time that the transactions for the notebook page have completed in the database. Upon the completion of a page in a chapter, the operator may proceed to execute another notebook page, such as the next defined fixed page. As is illustrated in FIG. 5, notebook page 500 can be accessed by selecting tab 520 which illustrates the name of the page and describes the page's transaction. Other pages in the chapter being viewed may be accessed by selecting any one of tabs 521–526. Note that e, ach of tab icons 521–525 are tabs represented by a solid outline indicating that each of the associated notebook pages are sequential or fixed pages. That is, execution of the notebook page represented by tab 520 must precede the notebook page represented by icon 521, execution of the notebook page represented by icon 521 must precede execution of the notebook page represented by icon 522, etc. The transactions associated with each notebook page must thus be performed in the sequence defined by the ordered appearance of icons 520–525.

Note also that tab icon 526 is shown in a dotted outline representation which indicates that the page is a "floating" page. A floating page, as discussed previously, is a notebook page which may be executed at any time during notebook execution or may not be performed at all. Thus, tab 526 which indicates "process instructions" may be accessed at any time by the user. Icon 526 does not get displayed for accessing the floating page initially when displaying the notebook chapter, but instead, the operator must first select floating page icon 527 on floating page icon bar 528 to execute the floating page. Once initially executed by selecting a floating page icon 527 on floating page icon bar 528, the floating page tab icon 526 with the dotted outline line representation appears on the display. The floating page may then be accessed at a later time by the operator by selecting icon 527 at the bottom of the display or by selecting tab 526. As is illustrated, only a single floating page is associated with this particular chapter in the notebook, and thus only icon 527 is displayed on floating page icon bar 528.

As shown on 212 of setup display 200, field 530 of FIG. 5 contains work instructions for the user. Icon 55 1 may also be selected to access additional work instructions associated with the page, if any. Moreover, area 531 displays information regarding all the items which are being worked on at the given workstation. The items illustrated in field 531 indicate those objects in the database for which transactions will be performed. For example, in the field shown as 531, the materials: "Boxes," "Designer Boxes," "Hardening powder," "Labels," "Pigment," and "Raw black" are indicated as being "received" at the workstation by executing transactions in the database. If any of these items are selected and edited by the operator, then the quantity of database objects for which transactions may be modified, for example, using icons 532–534. Editing of quantities or the characteristics of items for transformation using transactions in the database is performed using techniques well-known to those skilled in the prior art database arts. Thus, values may be manipulated so that transactions in the database may be performed which are an accurate reflection of actual operations performed at the workstation (e.g., consumption of a specific amount of material, creation of specific number of products, etc.).

Once the information has been entered into the fields displayed in region 531, then the operator may select 545 to commit to the database transactions associated with the page for the items listed in fields 53 1. The operator may also select cancel button 546 to abort execution of the notebook page. Upon selection of icon 545, any transactions associated with the page by the process engineer and the post-script after the transactions, if any, are executed. In the case of the "Receive" page 500 displayed in FIG. 5, the transactions performed in the database create records which indicate that the listed materials and quantities are now present at a certain location in the factory. All the transactions and results of the transactions are recorded in the database as a batch history associated with the notebook page. A complete history of the transactions associated with page 500 of FIG. 5 may be thus stored in the database for retrieval at a later date by supervisory or regulatory personnel.

Note that notebook page 500 does not contain an approval field, however, one may be present to allow a supervisor, verifier, or operator to "sign off" the notebook page prior to performance of transactions and the post-script, if any, associated with the page. Thus, as discussed previously, operator, supervisor, verifier, or any combination of the three types of approvals may be required to complete execution of a given notebook page. Moreover, notebook execution page 500 has associated with it icons 540–543 which correspond with icons 221–224 of FIG. 2. Thus, the user may obtain help by selecting icon 540, send a mail message in the system by selecting icon 541 using well-known electronic mailing techniques, or associate notes with a given notebook page to be stored and retrieved later by selecting icon 542. Any operator notes may be recorded by selecting icon 542. The process graph may be accessed by selecting icon 543, wherein the current chapter being executed (the workstation for the chapter) in the notebook is reflected by a highlighted icon on the process graph (e.g., 300 of FIG. 3). Lastly, icon 544 may be selected by the operator for suspending execution of the notebook at the page which is currently displayed. Thus, if the user selects icon 544, then any transactions and associated actions may be suspended at the point at which 500 of FIG. 5 is displayed. This is stored so that the operator may resume execution of the notebook at the page wherein execution was suspended. A note of this is made in the stored batch history associated with the notebook page so that execution of the notebook may resume later at the place where it was suspended.

Control of the Notebook During Run-Time

Now, a process which is used for controlling execution of a notebook chapter at an operator workstation during run-time will now be described with reference to FIGS. 6a–6c. Process 600 of FIGS. 6a–6c starts at step 601 on FIG. 6a wherein the notebook is commenced with the chapter for the workstation at which the operator is logged in. This may be done in a number of ways including, but not limited to, the user logging in at the workstation with a user ID and/or password. Then, the operator may select from a pull-down menu or other option menu, a particular production run which he wishes to work on. Once the operator selects the appropriate production run or batch to work on, then the system file server 130 downloads the chapter of the notebook which pertains to that production run. This includes the user interface displays, pre-scripts, and post-scripts, as well as current data from the database, among other things. At step 603, the page tabs for the pages in the notebook chapter are displayed. Then, at step 605, the page pre-script for the first page or the page at which execution was previously suspended is executed. Then, at step 607, the return code from the script is determined. If the script return code is GOTO n, then, at step 613, page n is displayed, and the page execution is continued at step 605 for page n.

If, however, the script return code is CONTINUE, as is detected at step 607. then the page is displayed with any values returned from the pre-script. Then, a variety of actions may be selected by the user by selecting areas on the user interface display. This includes, but is not limited to, the help, mail, notes, and process graph icons (e.g., 540–543 of FIG. 5), entry and modifications of any data into the data fields such as 53 1, the retrieval of any additional work instructions via an icon such as 551, or other user actions within the notebook page.

It is then determined whether the user depressed the "OK" button at step 61. and, if so, the data currently displayed is committed to the database at step 613. Transactions defined for the given notebook page are thus attempted to be performed, and a transaction log associated with the notebook page is recorded. Then, at step 615, the page post-script is executed. If, the transaction(s) aborted for some reason, these conditions may be checked by the script at this time. At step 617 of FIG. 6a, the return code from the post-script is examined. If the return code is GOTO n, then the notebook page proceeds to page n at step 618, and execution of page n is commenced at step 605. Thus, page execution of the previous page is complete. If, however, the return code is SKIP or NEXT, then process 600 proceeds to step 637 in FIG. 6b. In this instance, the page is marked as "skipped" by the script at step 637, and the process proceeds to the next page at step 635. Then, process 600 returns to step 605 of FIG. 6a. If, however, the script return code is CONTINUE, as detected at step 617, then process 600 proceeds to step 639 of FIG. 6b. In this instance, it is determined whether the last page of the notebook chapter has been displayed, and, if so, then execution of the notebook chapter is complete with all necessary data being stored (e.g., in database 140) at step 643. At this point, notebook chapter execution is complete and stored. If, however, it was not the last page in the chapter, as detected at step 639, then the next page is retrieved at step 635, and process 600 returns to step 605 of FIG. 6a for additional page execution.

Figure 6A:
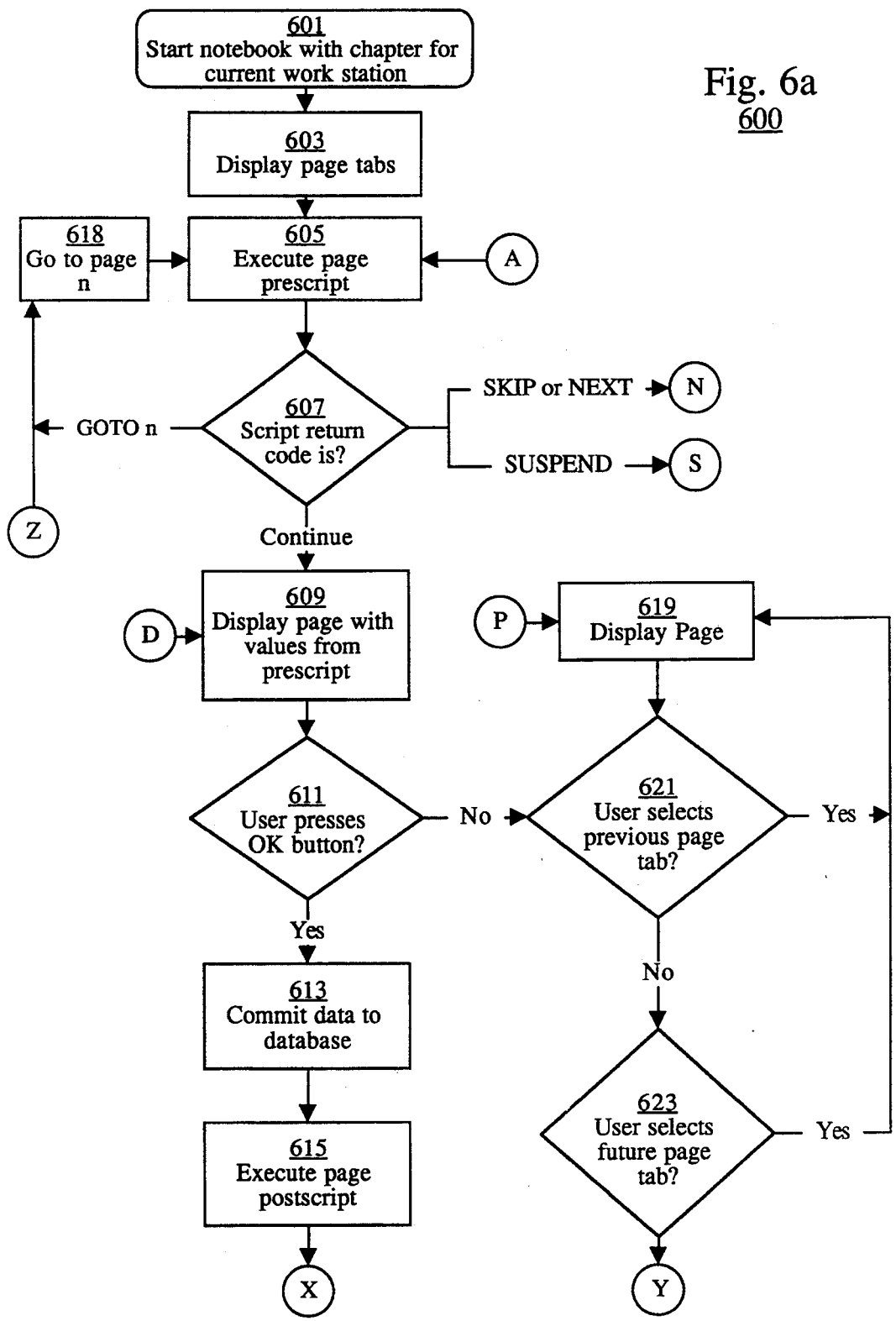
FIGS. 6a-6c illustrate a flow diagram of a process which controls a user interface display during run-time at one workstation.
Figure 6A:
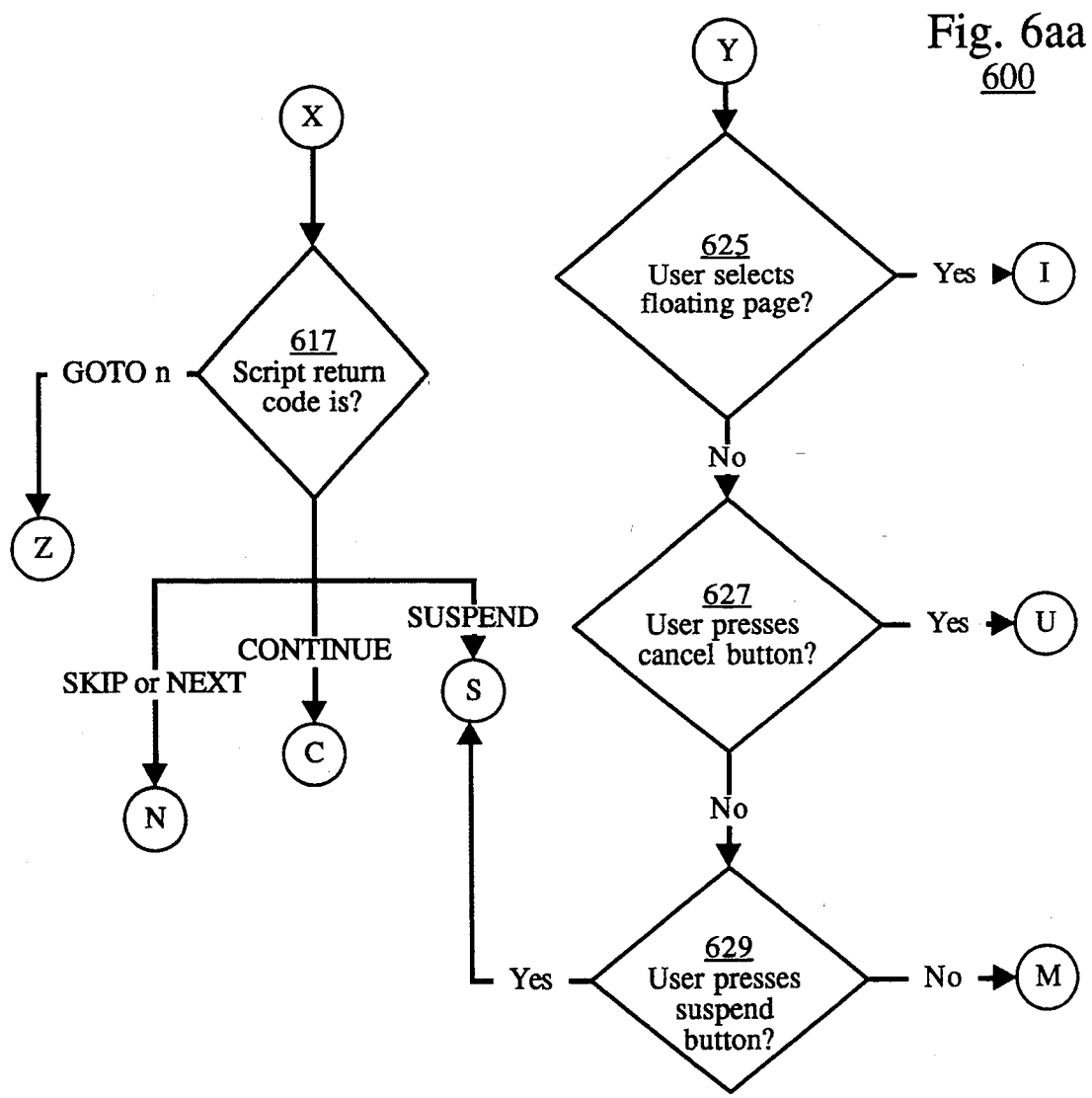
Figure 6B:
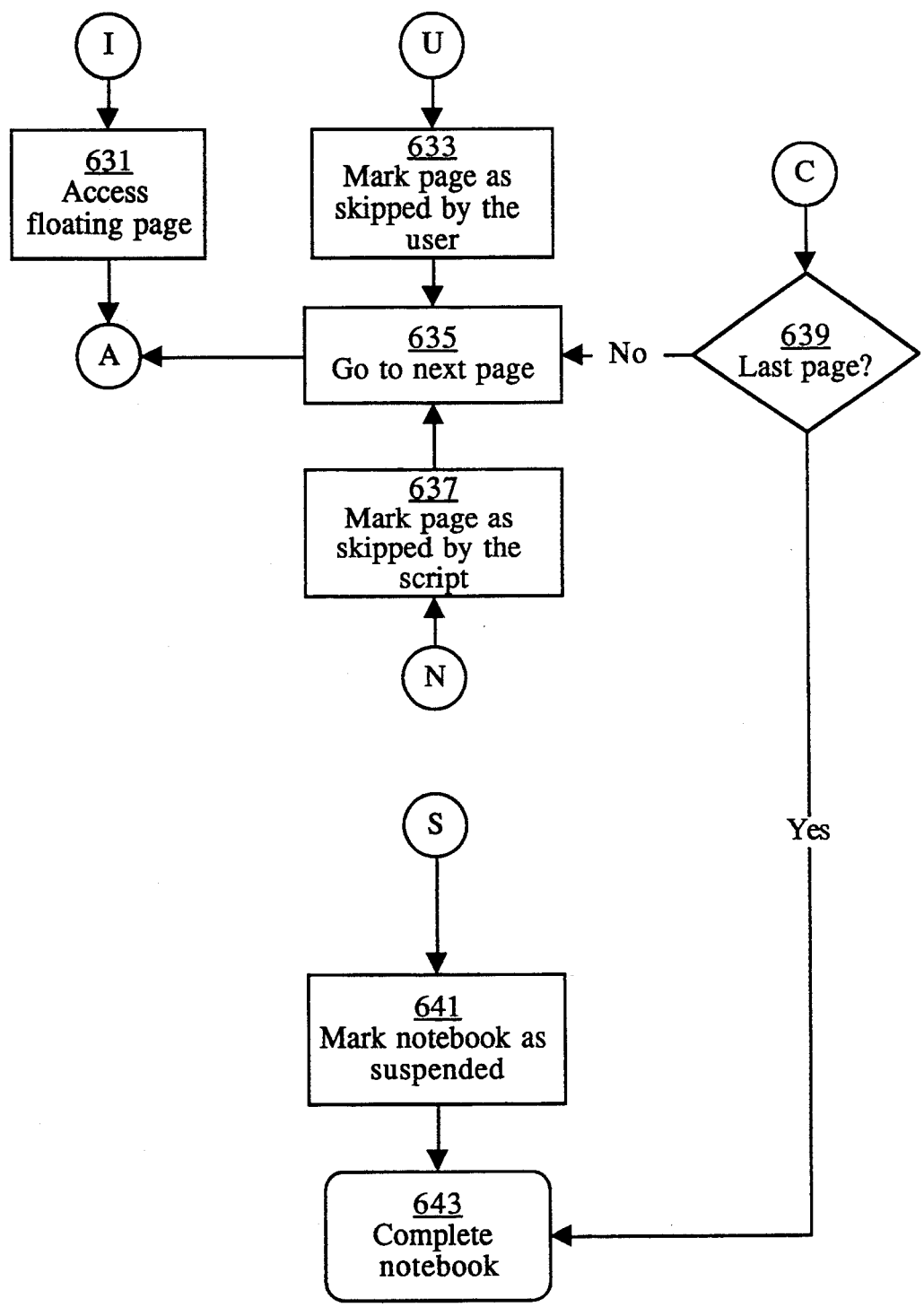

If, however, the script return code was SUSPEND, as detected at step 617. then process 600 proceeds to step 641 of FIG. 6b, and the notebook is marked in the database as "suspended." In this instance, the notebook may be resumed at the place where it was suspended by retrieving the incomplete batch notebook from database 140 by central file server 130. The notebook may then be retrieved completion at a later time. The notebook is complete at step 643 by being stored into database 140.

If the user has not depressed the "OK" button (e.g., 515 of FIG. 5), as detected at step 611 in FIG. 6a, then various checks are performed within process 600. At step 621 in FIG. 6a, it is detected whether the user has selected a previous page tab. If so, then that page is displayed at step 619. If, however, he does not select a previous page tab but does select a future page tab, as detected as step 623. then the page is also displayed. Either of these pages is displayed only and may not be executed because it has been accessed out of sequence. That is, no transactions or scripts associated with the page may be performed, and the user may not modify any displayed data. If, however, a floating page icon is selected at step 625 of FIG. 6aa (e.g., 527 shown in FIG. 5), then process 600 proceeds to access the floating page for execution at step 631 shown in FIG. 6b, and page execution continues at step 605 in FIG. 6a. If, however, the user selects the "cancel" button (e.g., 546 of FIG. as detected at step 627 of FIG. 6aa, then process 600 proceeds to step 633 in FIG. 6b and proceeds to access the next page at step 635. Then, page execution continues at step 605 of FIG. 6a. Finally, if the user selects the "suspend" button as detected at step 629 of FIG. 6aa (e.g., 544 of FIG. 5), then the notebook is marked as "suspended" at step 641, and the notebook is completed (e.g., stored in file server 140) at step 643 in FIG. 6b.

Figure 6C:
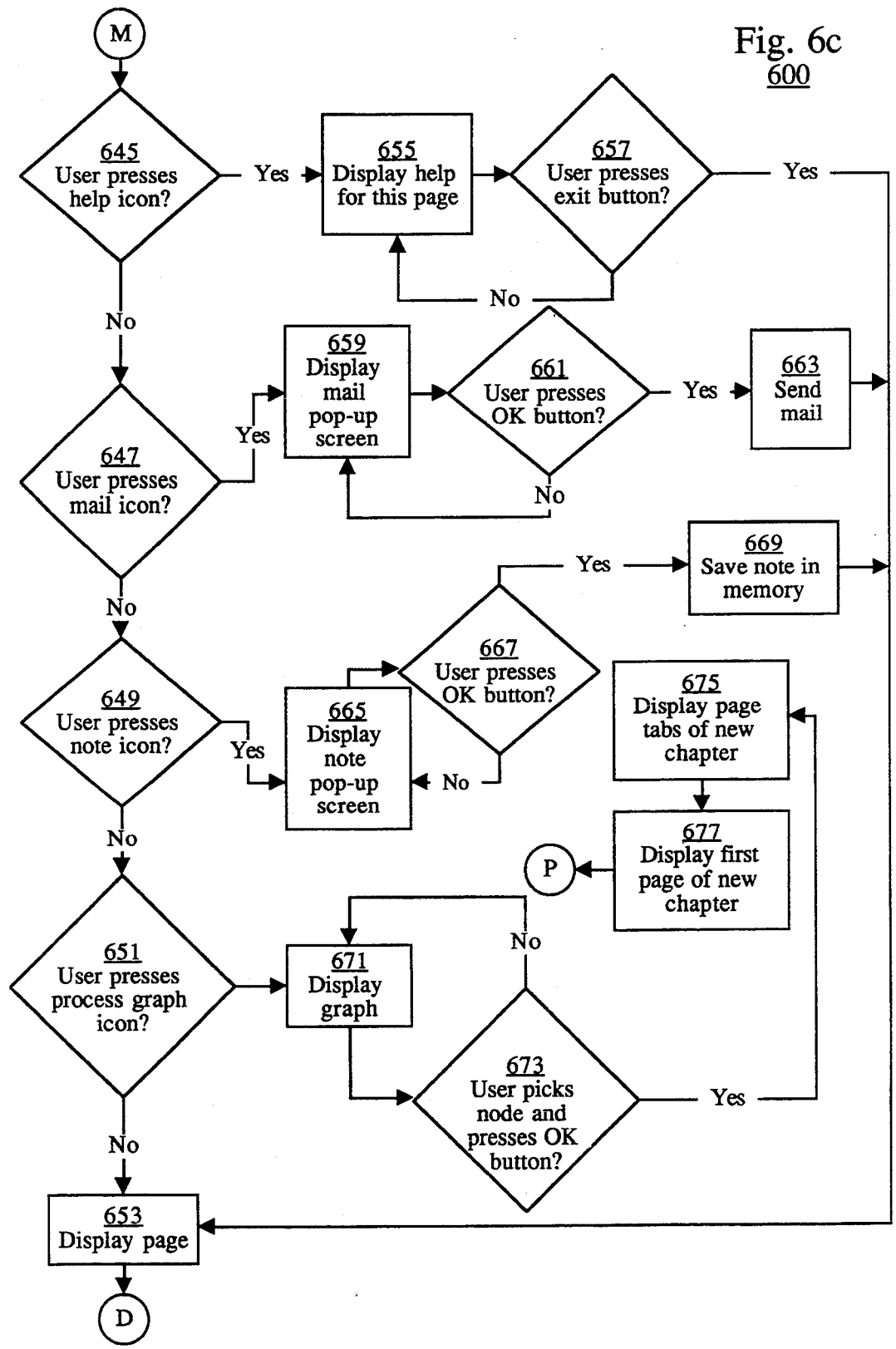

If, however, the user has not depressed the "suspend" button, as detected at step 629 in FIG. 6aa, then process 600 proceeds to step 645 of FIG. 6c. For example, it is determined at step 645 whether the user has depressed the "help" icon (e.g., 540 of FIG. 5). If so, then help information may be displayed for the page at step 655 in order to assist the operator in performing various actions on the page. If the user depresses the "exit" button within the help display, as detected at step 657, then the current notebook page is, again, redisplayed at step 653, and page execution continues at step 609 in FIG. 6a.

If the user, however, selects the "mail" icon (e.g., 541 of FIG. 51 , then a mail pop-up screen is displayed at step 659. This is performed in a manner well-known to those skilled in the prior art electronic mail arts and will not be discussed in more detail here. It is determined whether the user presses the "OK" button within the mail screen at step 661, and, if so, then the mail message is sent at step 663. If, however, the "OK" button has not been selected within the mail display, then the mail pop-up screen continues to be displayed at step 659. Then, upon the completion of sending mail at step 663, then the page is redisplayed at step 653, and execution of the page continues at step 609 in FIG. 6a.

If the user depresses the "note" icon (e.g., 542 of FIG. 5), as detected at step 649, then a note pop-up screen is displayed at step 665. As discussed previously, this allows the user to associate any note with the notebook page so that operator comments may be entered by the operator and stored at step 665 using well-known text entry techniques. Once the operator depresses the "OK" button within the note pop-up screen, as detected at step 667, then the note is saved into a mass storage device (e.g., database 140 or memory) at step 669, and the page is redisplayed at step 653. Then, page execution continues at step 609 in FIG. 6a.

If, however, the user depresses the process graph icon (e.g., 543 of FIG. 51. as detected at step 651, then the process graph is displayed at step 671 in a representation similar to that shown in FIG. 3, with the appropriate icon highlighted for the current chapter being executed. If the user selects a node in the graph and depresses the "OK" button, as determined at step 673, then the page tabs and the first page of new chapter may be displayed at steps 675 and 677 of FIG. 6c. If so, then the display of the page for the icon may be performed, however, no execution of that chapter may be performed since the chapter was not entered in the normal sequential manner (e.g., via 601 of FIG. 6a). In all other instances, the page is redisplayed at step 653, and process 600 continues at step 609 of FIG. 6a.

Thus, using the foregoing methods and apparatus, improved control of a transactional database, especially that for use in manufacturing and modeling a factory floor, may be performed. The notebook provides superior presentation and control of data, especially in manufacturing execution systems, to prior art techniques and eliminates the need for manual notebooks which must be transported from workstation to workstation per manufacturing batch on the factory floor. The automatic notebook user interface also provides superior information to that provided in manual prior art notebooks which are required for validation of manufacturing processes, due to certain regulatory requirements.

Notebook History Adjustment

Another option provided in one embodiment of the present invention is the adjustment of specific information contained within the notebook which is stored. For example, it may be necessary for a system administrator to adjust the attributes of a given lot of material manufactured or, alternatively, adjust a history of transactions performed within the database. Thus, for a given lot of material, a system administrator, upon entry of a suitable password or other security means, can adjust the attributes for a specific type of lot of material in the system. The details of such a transaction are not necessary for understanding this process, however, it is to be appreciated that there are times in which the information which is otherwise valid may be needed to be corrected or somehow updated within a notebook.

Likewise, various histories of transactions within a database may be required. One embodiment of the present invention allows the system administrator to correct values entered during various data transactions, such as collecting data, delete activity transactions, or add additional notes or comments to particular transactions within the database. For example, the system administrator may be able to adjust various activities that are performed, dates within which they are performed, log in times of specified users, execution of specified chapters, specified lots, or specified test plans within the database. Also, all of the transactions may be modified in any way at the administrator's discretion. It is anticipated, however, that such activities should be restrained to those users only at the highest security levels in the system and only allowed in very limited circumstances. Also, any transactions which are corrected or performed are stored in an audit trail, and, dates of transactions are recorded in the audit trail as the date and time at which the transactions are updated by the system administrator. Thus, corrections to the notebook's stored data may be viewed at a later time and subject to review by administrative personnel or other entities such as regulatory agencies.

Thus, in conclusion, an improved interface for performing transactions in a transactional database for modeling manufacturing execution has been described. Although the foregoing has been described specifically with reference to certain particular embodiments thereof and FIGS. 1–6c, these should not be viewed as limiting the present invention.

What is claimed is:

1. In a computer system comprising a database for modeling manufacturing in a factory, a display, and a user input device, wherein manufacturing operations in said factory are modeled as transactions in said database, an improved interface for controlling transactions in said database comprising a common display interface displayed on said display, said common display interface representing a series of transactions for a single manufacturing process, said common display interface comprising:

a. a plurality of subdisplays each separately accessible through said common display
      i. work instructions for operator actions to be performed related to said subprocess associated with said subdisplay;
      ii. a field comprising a plurality of factory objects for performing said discrete sets of transactions related to said subdisplay;
      iii. a label identifying said subprocess associated with said subdisplay;
      iv. time value fields indicating when said transactions associated with said subdisplay commenced and terminated;
   b. means for accessing a first group of said plurality of subdisplays in a sequential order, a first subdisplay in said first group being displayed first, and said transactions associated with said first subdisplay being performed prior to displaying subsequent subdisplays in said first group, and performance of transactions for said subsequent subdisplays; and
   c. means for accessing a second group of said plurality of subdisplays at arbitrary time intervals, and the performance of transactions associated with said second group of said plurality of subdisplays at said arbitrary time intervals.

2. The improved interface of claim 1 further comprising a sequence of commands associated with each said subdisplay, wherein a first of said sequence of commands is executed prior to displaying said subdisplay, and a second of said sequence of commands is executed after displaying said subdisplay.

3. The improved interface of claim 2 further comprising an information storing means for storing information contained in each of said plurality of subdisplays and the results of each of said first and second sequences of commands upon a completion of execution of each of said first and second sequences of commands, and said transactions associated with each of said plurality of subdisplays.

4. The improved interface of claim 2 further comprising means for accessing different subdisplays in said first group of subdisplays out of sequence depending upon conditions determined by said first and second sequences of commands.

5. The improved interface of claim 1 wherein at least one said subdisplay comprises a field for verification of information entered in said subdisplay by said operator.

6. The improved interface of claim 5 wherein said verification of said information comprises operator verification.

7. The improved interface of claim 5 wherein said verification of said information comprises supervisor verification.

8. The improved interface of claim 1 wherein said common display interface represents a production run in said factory.

9. The improved interface of claim 1 wherein said common display interface represents a process in said factory.

10. The improved interface of claim 1 wherein said common display interface represents a sequence of steps that are performed upon a resource in said factory.

11. The improved interface of claim 10 wherein said resource includes a workstation.

12. The improved interface of claim 10 wherein said resource includes a storage location.

13. The improved interface of claim 10 wherein said resource includes a labor resource.

14. The improved interface of claim 10 wherein said resource includes an equipment resource.

15. The improved interface of claim 1 further comprising a plurality of said common display interfaces, each of said common display interfaces associated with a different workstation in said factory for performing sets of transactions associated with each said different workstation.

16. The improved interface of claim 1 wherein a first number of said plurality of subdisplays each comprises operator input fields for input of information by said operator related to said transactions associated with said subdisplay.

17. The improved interface of claim 1 wherein each of said plurality of subdisplays comprises a suspend process means for suspending execution of said transactions associated with said subdisplay.

18. The improved interface of claim 1 further comprising a plurality of said common display interfaces for display on said computer system display, each of said plurality of common display interfaces associated with sets of transactions in said factory representing manufacturing operations at different workstations in said factory.

19. In a computer system comprising a database for modeling manufacturing in a factory, a display, and a user input device, wherein manufacturing in said factory is modeled using transactions in said database, a method for displaying an interface for controlling said transactions in said database comprising displaying a common display interface on said display, said common display interface representing a series of transactions for a single manufacturing process, and further comprising:
  a. displaying a plurality of subdisplays within said common display interface each separately accessible through said common display interface and displayed upon said computer system display, each of said plurality of subdisplays related to subprocesses within said single manufacturing process and accessible using selections of said user input device;
  b. displaying a first set of icons for accessing a first group of said plurality of subdisplays in a sequential order, a first subdisplay in each of said first group being displayed first, and said transactions associated with said first subdisplay being performed prior to displaying subsequent subdisplays in said first group of said plurality of subdisplays, and performing transactions for said subsequent subdisplays; and
  c. displaying a second set of icons for accessing a second group of said plurality of subdisplays at arbitrary time intervals, and the performance of transactions associated with said second group of said plurality of subdisplays at said arbitrary time intervals.

20. In a computer system comprising a database for modeling manufacturing in a factory, a display, and a user input device, wherein manufacturing in said factory is modeled using transactions in said database, an apparatus for displaying an interface for controlling said transactions in said database comprising a means for displaying a common display interface on said computer system display, said common display interface representing a series of transactions for a single manufacturing process, and further comprising:
  a. means for displaying a plurality of subdisplays each separately accessible through said common display interface and displayed within said common display interface, each of said plurality of subdisplays related to subprocesses within said single manufacturing process and accessible using selections said using input device;
  b. means for accessing a first group of said plurality of subdisplays in a sequential order, a first subdisplay in each of said first group being displayed first, and said transactions associated with said first subdisplay being performed prior to the display of subsequent subdisplays, and performance of transactions for said subsequent subdisplays; and
  c. means for accessing a second group of said plurality of subdisplays at arbitrary time intervals, and the performance of transactions associated with said second group of said plurality of subdisplays at said arbitrary time intervals.

21. In a system for modeling manufacturing in a factory, said system comprising a database, a display, and a user selection device, wherein manufacturing in said factory is modeled by executing transactions in said database, a method for controlling said execution of said transactions in said database comprising:
  a. displaying a common display interface on said display, said common display interface representing a series of transactions for a single manufacturing process;
  b. displaying a plurality of icons on said common display interface for accessing a plurality of subdisplays, each of said plurality of subdisplays separately accessible through said common display interface by selecting each of said icons using said user selection device, each of said plurality of subdisplays related to subprocesses within said single manufacturing process, a first group of said icons capable of selection in a sequential order for accessing a first group of said plurality of subdisplays in said sequential order, a second group of said icons capable of selection at arbitrary time intervals for accessing a second group of said plurality of subdisplays in said arbitrary order;
  c. detecting selections of each of said first group of said icons on said common display interface in said sequential order,
  d. displaying each of said first group of said plurality of subdisplays on said common display interface in said sequential order upon each of said selections of said first group of icons; and
  e. performing transactions associated with each of said first group of said plurality of subdisplays in said sequential order.

22. The method of claim 21 wherein said common display interface and each of said plurality of subdisplays is displayed as a representation of pages in a notebook, and each of said plurality of icons is displayed as a representation of tabs in said notebook.

23. The method of claim 21 wherein said step of displaying each of said first group of said plurality of subdisplays includes displaying fields for allowing an operator to input information regarding said transactions.

24. The method of claim 23 further comprising the step of requesting verification of said information from a user on at least one of said first group of said plurality of subdisplays, and if said information on said at least one subdisplay has been verified then performing said transactions associated with said at least one subdisplay.

25. The method of claim 24 wherein said user comprises said operator.

26. The method of claim 24 wherein said user comprises a supervisor.

27. The method of claim 24 wherein said step of requesting verification from a user comprises requesting a password.

28. The method of claim 24 wherein said step of requesting verification from a user comprises automatically inputting verification information using a verification apparatus.

29. The method of claim 21 wherein said step of displaying each of said first group of said plurality of subdisplays includes displaying work instructions for instructing operator actions related to said subprocesses associated with said subdisplay.

30. The method of claim 21 wherein said step of displaying each of said first group of said plurality of subdisplays includes displaying a field comprising a plurality of factory objects for performing said transactions related to said subdisplay.

31. The method of claim 21 wherein said step of displaying each of said first group of said plurality of subdisplays includes displaying a label identifying said subprocess associated with said subdisplay.

32. The method of claim 21 wherein said step of displaying each of said first group of said plurality of subdisplays includes displaying time value fields indicating when said transactions associated with said subdisplay commenced and terminated.

33. The method of claim 21 further comprising the step of storing a log of said transactions associated with each of said first group of said plurality of subdisplays subsequent to said execution of said transactions.

34. In a system for modeling manufacturing in a factory, said system comprising a database, a display, and a user selection device, wherein manufacturing in said factory is modeled by executing transactions in said database, a method for controlling said execution of said transactions in said database comprising:
 a. displaying a common display interface on said display, said common display interface representing a series of transactions for a single manufacturing process;
 b. displaying a plurality of icons on said common display interface for accessing a plurality of subdisplays, each of said plurality of subdisplays separately accessible through said common display interface by selection of each of said icons using user selection device, each of said plurality of subdisplays related to subprocesses within said single manufacturing process, a first group of said icons capable of selection in a sequential order for accessing a first group of said plurality of subdisplays in said sequential order, a second group of said icons capable of selection at arbitrary time intervals for accessing said second group of said plurality of subdisplays in said arbitrary order wherein said common display interface and each of said plurality of subdisplays is displayed as a representation of pages in a notebook, and each of said plurality of icons is displayed as a representation of tabs in said notebook;
 c. detecting selections of each of said first group of said icons on said common display interface in said sequential order,
 d. displaying each of said first group of said plurality of subdisplays within said common display interface in said sequential order upon each of said selections: and
 e. performing transactions associated with each of said first group of said plurality of subdisplays in said sequential order.

35. The method of claim 34 further comprising the step of storing a log of said transactions associated with each of said first group of said plurality of subdisplays subsequent to said execution of said transactions.

36. In a system for modeling manufacturing in a factory, said system comprising a database, a display, and a user selection device, wherein manufacturing in said factory is modeled by executing transactions in said database, an interface for controlling said execution of said transactions in said database comprising a common display interface displayed on said display, said common display interface representing a series of transactions for a single manufacturing process and a plurality of icons displayed on said common display interface for accessing a plurality of subdisplays, each of said plurality of subdisplays separately accessible through said common display interface by selecting each of said icons using user selection device, each of said plurality of subdisplays related to subprocesses within said single manufacturing process, a first group of said icons capable of selection in a sequential order for accessing a first group of said plurality of subdisplays in said sequential order, a second group of said icons capable of selection at arbitrary time intervals for accessing said second group of said plurality of subdisplays in said arbitrary order wherein said common display interface and each of said plurality of subdisplays is displayed as a representation of pages in a notebook, and each of said plurality of icons is displayed as a representation of tabs in said notebook.

37. A system for modeling manufacturing in a factory, said system comprising a database, a display, and a selection device, wherein manufacturing in said factory is modeled by executing transactions in said database, said system further comprising an interface for controlling said execution of said transactions in said database comprising:
 a. a common display interface displayed on said display, said common display interface representing a series of transactions for a single manufacturing process:
 b. a plurality of icons displayed on said common display interface, a first group of said icons capable of selection only in a sequential order, and a second group of said icons capable of selection at arbitrary time intervals using said user selection device; and
 a plurality of subdisplays, each of said plurality of subdisplays separately accessible through said common display interface by selecting each of said icons using selection device, each of said plurality of subdisplays displayed upon selection of said icons within said common display interface and controlling transactions for a subprocess within said single manufacturing process, a first group of said plurality of subdisplays accessible by selecting each of said first group of icons in said common display interface and performing said transactions for each said subprocess for each of said first group of subdisplays in said sequential order, a second group of said plurality of subdisplays accessible by selecting each of a second group of said icons at arbitrary time intervals.

38. The system of claim 37 wherein said common display interface and each of said plurality of subdisplays is displayed as a representation of pages in a notebook, and each of said plurality of icons is displayed as a representation of tabs in said notebook.

39. The system of claim 37 further comprising a plurality of said common display interfaces, each of said plurality of common display interfaces associated with a different workstation in said factory for performing a plurality of transactions for each workstation in said hectory associated with different manufacturing operations.

40. The system of claim 39 wherein records of each of said transactions associated with each of said workstations in said factory are stored in a batch record for later retrieval.

41. The system of claim 40 wherein said batch record includes time and date information regarding the execution of transactions,

42. The system of claim 37 wherein a first group of said plurality of subdisplays comprises operator input fields for input of explanatory information by said operator related to said transactions associated with said subdisplay.

43. The system of claim 37 wherein a first group of said plurality of subdisplays comprises verification fields for verifying the execution of said transactions associated with said subdisplay prior to performing said transactions associated with said plurality of subdisplays.

* * * * *